United States Patent [19]

Adam et al.

[11] Patent Number: 5,040,430

[45] Date of Patent: Aug. 20, 1991

[54] CONTROL DRIVE PARTICULARLY A WINDOW-ACTIVATED DRIVE FOR MOTOR VEHICLES

[75] Inventors: Peter Adam, Hoechberg; Wolfram Knappe, Kitzingen; Peter Michel, Kleinrinderfeld, all of Fed. Rep. of Germany

[73] Assignee: Siemens Aktiengesellschaft, Berlin & Munich, Fed. Rep. of Germany

[21] Appl. No.: 593,514

[22] Filed: Oct. 2, 1990

Related U.S. Application Data

[63] Continuation of Ser. No. 410,926, Sep. 22, 1989, abandoned.

[30] Foreign Application Priority Data

Sep. 30, 1988 [EP] European Pat. Off. ........ 88116226.7

[51] Int. Cl.[5] ........................ E05F 11/48; F16H 1/18

[52] U.S. Cl. .................................... 74/425; 74/89.14; 49/349

[58] Field of Search .................... 74/425, 89.14, 89.22; 49/352, 349; 464/89, 93, 92

[56] References Cited

U.S. PATENT DOCUMENTS

| | | | |
|---|---|---|---|
| 4,235,117 | 11/1980 | Pickles | 49/349 |
| 4,428,250 | 1/1984 | Becker et al. | 74/425 |
| 4,643,040 | 2/1987 | Adam et al. | 49/349 |
| 4,770,056 | 9/1988 | Becker et al. | 74/505 |

FOREIGN PATENT DOCUMENTS

| | | |
|---|---|---|
| 2952408 | 7/1981 | Fed. Rep. of Germany . |
| 3027154 | 2/1982 | Fed. Rep. of Germany . |
| 3438754 | 5/1985 | Fed. Rep. of Germany . |
| 8138613 | 7/1986 | Fed. Rep. of Germany . |
| 3519056 | 7/1987 | Fed. Rep. of Germany . |

*Primary Examiner*—Leslie A. Braun
*Assistant Examiner*—Winnie Yip
*Attorney, Agent, or Firm*—Kenyon & Kenyon

[57] ABSTRACT

In order to produce a window-actuator drive having assembly and service friendliness, particularly by providing a design which enables the gearbox unit to be easily exchanged, the drive is designed as two functionally separate units. A gear housing, a worm gear, and a housing cover which is sealed off from them both makes up a first unit. A cable housing with a cable pulley makes up a second unit. The subassemblies of the first and second unit can be assembled by means of notched, snap-fit connections.

20 Claims, 2 Drawing Sheets

CONTROL DRIVE PARTICULARLY A WINDOW-ACTIVATED DRIVE FOR MOTOR VEHICLES

This application is a continuation, of application Ser. No. 07/410,926, filed Sept. 22, 1989 now abondoned.

BACKGROUND OF THE INVENTION

This invention relates to control drives in general and more particularly to a window-actuator drive for motor vehicles which includes two separate units to be assembled together.

In a prior art control drive of this type, the first unit, which is on the side of the motor, comprises at least a cup-shaped housing with an axle mounted in its cup-shaped base, and a driving disk rotatably supported on the axle, which is driven by a driving motor. The second unit, which is on the driven side, comprises at least a second housing with an driven disk rotatably supported therein. When the units are assembled together, the driven disk can be supported on the axle protruding axially out of the first unit. Such a control drive is disclosed in the DE-02-35 19 056.

In the window-actuator drive unit disclosed in the DE-02 35 19 056, a worm gear acting as a driving gear and a cable pulley acting as an driven drive, as well as a separate adapter piece provided between them to effect a reciprocal rotational-slave relationship, are all rotatably supported on an axle. this axle has its axial ends supported in bearing bushings, one of which is secured in the housing base of the cup-shaped gear housing and the other in a flat wall section. This flat wall section can be bolted to the gear housing, with a ring-shaped cable pulley housing structure interposed. When the total drive unit is in its assembled state, the cable pulley housing structure is used as a seal for the cup-shaped gear housing, which otherwise is open. To hold the subassemblies of each unit together, only the worm gear is mounted on the axle in the first subassembly, which is on the side of the motor. In the assembly on the driven side, the bearing bushing for the axle is provided with a radial, peripheral collar. Between this collar and the flat wall section, both the separate driving disk, as well as the cable pulley, are fit in a concentric bearing arrangement into a corresponding radial recess on the bearing bushing.

In a cable window-actuator drive for a motor vehicle disclosed in the DE-A1-34 38 254, the driving gear and the cable pulley subassembly are accommodated in a common housing made of two half-shell shaped housing halves. The open sides of the housing halves lie opposite each other. One housing half encloses (in a cup shape) the worm shaft, which is driven by a flanged electric motor, as well as the worm gear which mates with this worm shaft. The other housing half encloses (in a cup shape) the cable pulley, which has a cable looped around it.

in view of the prior art, there is a need for a control drive for a motor vehicle, in particular a window-actuator drive of the type mentioned in the beginning, which is has improved assembly and service friendliness, particularly with regard to the ease of assembly and disassembly of the gearbox unit.

SUMMARY OF THE INVENTION

According to the present invention, this task is accomplished by making the gear box unit a cup-shaped housing which secures the driving gear axially and which is sealed by a housing cover. This housing is sealed off from a protruding slaving member of the driving gear. A second housing, which is also cup-shaped, can be assembled at a position opposite the gear housing or the housing cover and is directly connected to the driven disk. This disk is attached to the axle when the two units are assembled.

With the design of the present invention, a functional separation is achieved between the gearbox unit and the cable pulley unit in the sense that the gearbox unit can be installed or disassembled independently of the cable pulley unit in, for example, the door of a motor vehicle. In addition to this functional separability, the moisture-sensitive gearbox unit can be advantageously sealed off from the cable pulley unit. This is accomplished in a simple manner with only a modest expenditure for the subassemblies themselves and for the assembly of both units together. The worm gear, which is rotatably supported in the gear housing can be sealed off from the concentrically surrounding housing cover and the axle by seals, in particular, by O-ring seals. This axle is thereby secured in the gear housing and accommodates the driving disk and the driven disk.

As is generally known, the rotational-slave relationship between the driving disk and the driven disk is achieved with the use of axially protruding cams, which are formed on these disks. In order to prevent sudden loads, damping disks with axially open carrier pockets are provided. The slaving cams extend into these carrier pockets. According to a first refinement of the invention, the slaving cams are provided on the driving disk. When the units are assembled and the damping disk is interposed, these slaving cams slip into the corresponding carrier pockets of the driven disk. According to a second refinement of the invention, as an alternative to the aforementioned solution, the slaving cams are provided on the driven disk. When the units are assembled and the damping disk is interposed, the slaving cams are configured so they slip into the corresponding carrier pockets of the driving disk.

The subassemblies are configured so that they can be assembled with plug-in connections which are preferably axial. This enables both units to be easily assembled with minimal expenditure, particularly by using robots. Such a fastening method is especially suited for subasseblies of the second unit, which among other things accommodates the cable pulley. In order to make use of this type of connection, according to a refinement of the invention, the second housing, the driven disk and its damping element, and possible an additional coupling disk, are provided with interlocking fasteners which are reciprocal, axial plug-in connections.

DETAILED DESCRIPTION

Figure 1:
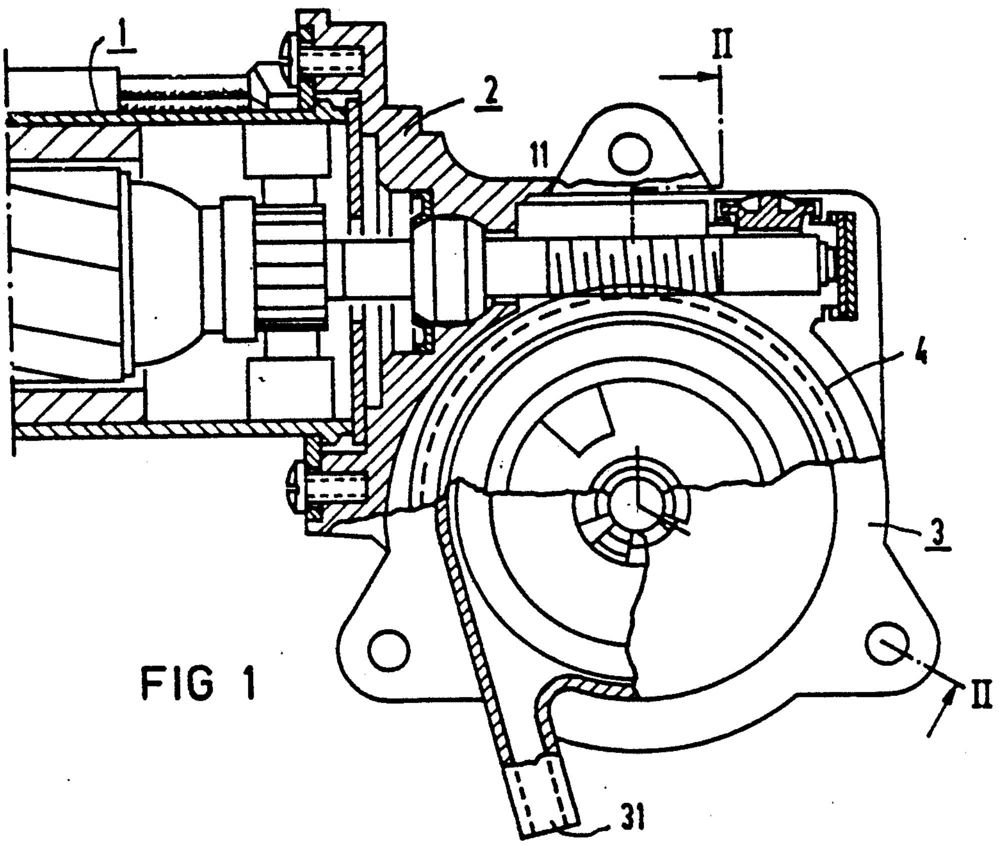
FIG. 1 is an axial view, partially in cross-section, of an electromotive cable window-actuator drive for a motor vehicle according to the present invention.

In an axial, longitudinal view, FIG. 1 illustrates an electromotive window-actuator drive for a motor vehicle, partially in section. The electric motor 1 is indicated only schematically. Its elongated rotor shaft extends as a worm shaft 11 into a cup-shaped gear housing 2, which is flanged onto the housing of the electric motor 1 and can be sealed with a gear housing cover 21. This worm shaft 11 drives a worm gear 4, which is rotatably supported on an axle 9 which in turn is anchored in the gear housing 2. The worm gear 4 acts as a driving disk.

Figure 2:
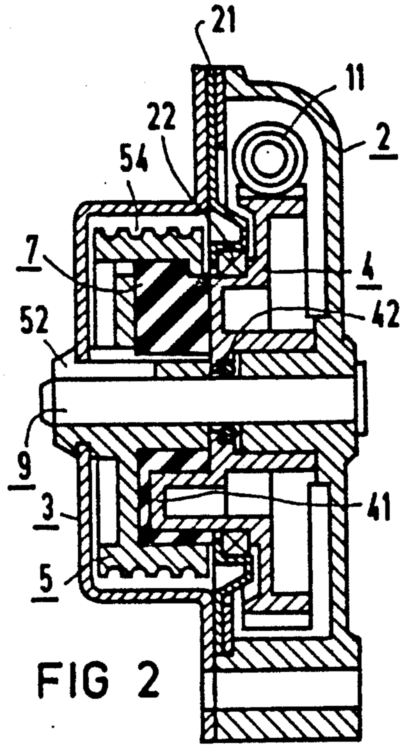
FIG. 2 is a sectional view of the design according to the invention of the window-actuator drive for a motor vehicle taken along the sectional line II—II.
Figure 6:
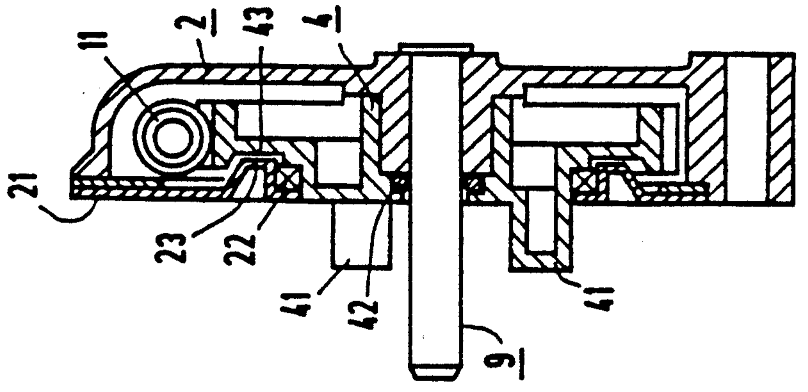
FIG. 6 illustrates the first unit in the final assembly state before it is joined to the second unit.

According to the refinement of FIGS. 2 and 6, the worm gear 4 has slaving cams 41 axially protruding on its front side and distributed over its circumference. With the insertion of a damping disk 7 as a separator, these slaving cams 41 can slip axially into corresponding carrier pockets of a cable pulley 5, which acts as a driven disk. The cable pulley 5, which is rotatably supported by an axle bore 55 on the axle 9, has cable grooves 54 on its outer circumference to pick up a cable (not shown here), which is looped several times around it. The ends of this cable can be guided in or out through cable guide openings 31 in the cup-shaped cable pulley housing 3.

Further details concerning the two subassembly units are described in the following, based on FIGS. 4 to 6.

Figure 4:
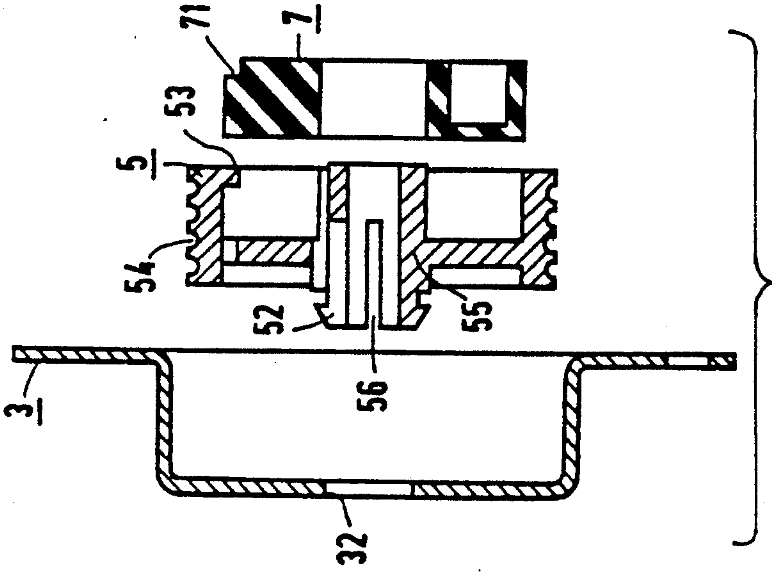
FIG. 4 is an axial, exploded view of the subassemblies to be axially joined to the first unit.

FIG. 4 illustrates the fundamental subassemblies of the second unit. They comprise the cable pulley 5 with cable grooves 54 on its outer circumference, the damping disk 7 which acts as a rotating slave to the cable pulley 5, and the cable pulley housing 3 which contains both the cable pulley 5 and the damping disk 7. In order to assemble these components of the second unit into their final state, the cable pulley housing 3 is provided with a bottom opening, which has a slot 32. This is illustrated in FIG. 5. The hooks 52 on the unattached end of the axle bore 55 of the cable pulley 5 engage behind this slot 32 when both subassemblies are joined axially. The hooks 52 and the slots 32 are interlocking fasteners forming axially interconnecting connections. As a result of an axial slit 56 in the unattached end of the axle bore 55, the hooks 52 can be pushed away radially in a flexible fashion when the cable pulley housing is assembled.

A projection 53 protruding radially inward is provided on the right front end of the cable pulley 5. A notch 71 on the damping disk 7 can engage flexibly behind this projection 53. The projection 53 and the notch 71 are interlocking fasteners forming axially interconnecting connections. Thus, the cable pulley 5, the damping disk 7 and the cable pulley housing 3 are interconnected in a snap-fit manner as required.

FIG. 6 depicts the completely assembled first unit with the cup-shaped gear housing 2, the axle 9 secured within it, and the worm gear which is rotatably supported on the axle 9 and which is driven by the worm shaft 11. Also shown is the gear housing cover 21, which seals the cup-shaped gear housing and maintains all subassemblies in their proper position. The axle 9, as well as the axially protruding slaving cams 41 which are distributed over the circumference of the worm gear 4, project over the outer front end of the gear housing cover 21 and are directed toward the second unit. According to a refinement of the invention, the gear housing cover 21 is completely sealed off from the axially traversing slave member of the worm gear 4 by means of a housing seal 22, specifically an O-ring seal. Also, the worm gear 4 is itself completely sealed off from the axle 9 by means of an axle seal 42. Thus, after both units are assembled, any moisture which is carried by the cable guide through the cable guide openings 31 and into the cable pulley housing 3 cannot penetrate into the gear unit. Therefore, moisture cannot further penetrate into the motor unit in a roundabout way. A circular guiding lug 23 is advantageously molded into the housing cover 21. A corresponding circular guiding groove 43 is molded into the worm gear 4 and is mated to this guiding lug 23 in order to provide axial and radial locking of the worm gear 4. It is also possible to interchange the guiding lug and the guiding groove.

When the two units are assembled and a damping disk 7 is interposed, the slaving cams 41 of the worm gear 4, which protrude axially toward the middle, slip into corresponding carrier pockets 71 of the cable pulley 5. After both units are assembled, the cable pulley 5 is advantageously braced against a radial cable tension load on the axle 9 which is introduced in the axle bore 55.

Figure 3:
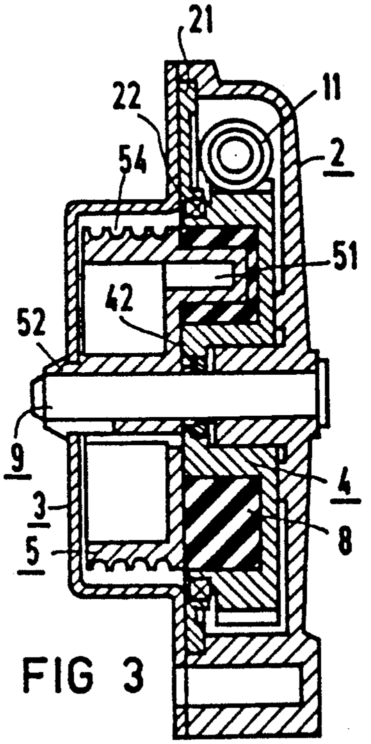
FIG. 3 is a sectional view of an alternative layout of FIG. 2, with regard to the mounting of slaving cams.
Figure 5:
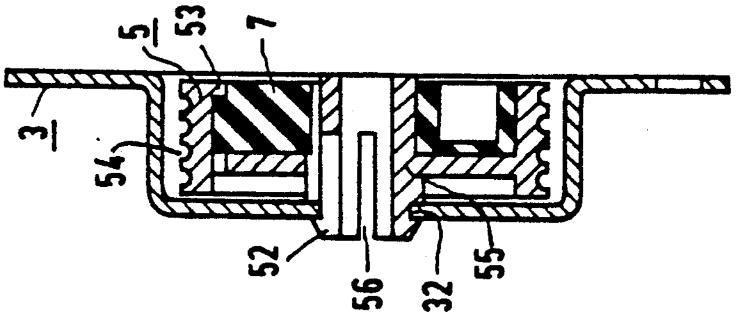
FIG. 5 illustrates the subassemblies according to FIG. 4 in their final assembly state.

FIG. 3 depicts an alternative design, which differs from that of FIGS. 1 and 2 as well as FIGS. 4 to 6 in that the axially protruding slaving cams 51 protrude from on the cable pulley 5. With the insertion of a damping disk 8 as a separator, these cams slip into corresponding carrier pockets of the worm gear 4, which thereby acts as a rotating slave. As with the first damping disk 7, the damping disk 8 can be connected to the worm gear 4 via an axially installable latching system.

When the first unit is assembled with the second unit, the axially protruding axle journal of the axle 9 is used advantageously not only to rotatably support and radially brace the cable pulley 5, but also to provide an axiâl, flush alignment of the entire second unit to the first unit. This connection can be achieved in the usual manner. For example, it can be achieved by clamping, welding, etc.

We claim:

1. In a control drive, having an electric motor and two separate units assembled together including a first unit secured to a side of the motor with comprises: a first cup-shaped gear housing, an axle mounted in said cup-shaped housing and protruding axially out of said first unit, and a driving disk rotatably supported on said axle and driven by said motor, said driving disk including a protruding slaving member extending substantially parallel to said axle; and a second unit positioned on an ouput driven side of the control device and having a second housing, a driven disk having an extending member, said driven disk rotatably supported by said second housing through said extending member, such that, when the units are mutually assembled, said driven disk is supported on said axle protruding axially out of the first unit, the improvement comprising: said first unit being separable and distinct from said second unit, a housing cover secured to the first cup-shaped housing for sealing and securing in position the driving disk; a first seal positioned between sad housing cover and said driving disk for sealing said cover from the protruding slaving member of the driving disk; and the second housing of said second unit being cup-shaped and disposed opposite said first housing, said driven disk supported for rotation through said extending member by said second housing so that said first and second units can be separated without disassembling either of said units, said driven disk being supported for rotation of said axle and by said second housing when said first and second units are assembled.

2. The control drive of claim 1 wherein a rotational-slave relationship is provided between the driving disk and the driven disk by means of axially protruding slaving cams and damping elements convering said slaving cams on the outside at least in the direction of rotation, the improvement further comprising the slaving cams being on the driving disk and corresponding carrier pockets formed in the driven disk, whereby, when the units are assembled and a damping disk is interposed, said slaving cams slip into said pockets.

3. The control drive of claim 2 wherein said subassemblies of the units are adapted to be joined by an axial snap-fit connection.

4. The control drive of claim 3, wherein said second housing, said driven disk and its damping element include interlocking fasteners forming axially interlocking connections.

5. The control drive of claim 4 for a window-actuator drive in a motor vehicle wherein said first housing is a gear housing, said driving disk is a worm gear driven by said electric motor, said motor having an elongated rotor shaft extending as a worm shaft into the gear housing mating with said worm gear, said second housing is a cable pulley housing, and said driven disk is a cable pulley which is used to actuate the cable line of the window actuator situated in a door of the motor vehicle.

6. The control drive of claim 5 and further including a second seal sealing said driving disk from said axle.

7. The control drive of claim 6, wherein said first seal and said second seal comprises O-ring seals.

8. The control drive of claim 1 wherein a rotational-slave relationship between the driving disk and the driven disk is provided by means of axially protruding slaving cams and damping elements covering said slaving cams to the outside at least in the direction of rotation, the improvement further comprising the slaving cams being on the driven disk and corresponding carrier pockets formed in the driving disk whereby when the units are assembled and a damping disk is interposed, said slaving cams slip into said pockets.

9. The control drive of claim 8, wherein said subassemblies of the units are adapted to be joined by an axial snap-fit connection.

10. The control drive of claim 9, wherein said second housing, said driven disk and its damping element include interlocking fasteners forming axially interlocking connections.

11. The control drive of claim 10 for a window-actuator drive in a motor vehicle wherein said first housing is a gear housing, said driving disk is a worm gear driven by said electric motor, said motor having an elongated rotor shaft extending as a worm shaft into the gear housing mating with said worm gear, said second housing is a cable pulley housing, and said driven disk is a cable pulley which is used to actuate the cable line of the window actuator situated in a door of the motor vehicle.

12. The control drive of claim 11 and further including a second seal sealing said driving disk from said axle.

13. The control drive of claim 1 wherein said subassemblies of the units are adapted to be joined by an axial snap-fit connection.

14. The control drive of claim 13, wherein said second housing, said driven disk and its damping element include interlocking fasteners forming axially interlocking connections.

15. The control drive of claim 1 and further including a second seal sealing said driving disk from said axle.

16. The control drive of claim 15, wherein said first seal and said second seal comprises O-ring seals.

17. The control drive of claim 16, wherein said O-ring seal sealing said driving disk from the housing cover is a single-piece component of the housing cover.

18. The control drive of claim 1 and further including means to axially align said second housing unit on the axle of the first unit.

19. The control drive of claim 1 for a window-actuator drive in a motor vehicle wherein said first housing is a gear housing, said driving disk is a worm gear driven by said electric motor, said motor having an elongated rotor shaft extending as a worm shaft into the gear housing mating with said worm gear, said second housing is a cable pulley housing, and said driven disk is a cable pulley which is used to actuate the cable line of the window actuator situated in a door of the motor vehicle.

20. A control drive comprising:

a. an electric motor;

b. a first unit secured to a side of the motor which comprises: a first cup-shaped gear housing, an axle mounted in said cup-shaped housing and protruding axially out of said first unit, a driving disk rotatable supported on said axle and driven by said motor, said driving disk including a protruding slaving member extending substantially parallel to said axle, a housing cover secured to the first cup-shaped housing for sealing and securing in position the driving disk; a first seal positioned between said housing cover and said driving disk for sealing said cover from the protruding slaving member of the driving disk; and c. a second unit positioned on an output driven side of the control drive and being separated and distinct from the first unit which comprises: a second cup-shaped housing, a driven disk having an axially extending member, said driven disk rotatably supported by said second housing through said extending member, such that, when the separate and distinct first and second units are mutually assembled to form said control drive, said second housing is disposed opposite said first housing, and said driven disk of said second unit is supported for rotation on said axle protruding axially out of the first unit and by said second housing.

* * * * *